United States Patent
Iyer et al.

(10) Patent No.: US 10,528,452 B2
(45) Date of Patent: *Jan. 7, 2020

(54) SYSTEM AND METHOD FOR DETECTING AND ALERTING UNEXPECTED BEHAVIOR OF SOFTWARE APPLICATIONS

(71) Applicant: INTERNATIONAL BUSINESS MACHINES CORPORATION, Armonk, NY (US)

(72) Inventors: Chitra A. Iyer, Bangalore (IN);
Angelika Kozuch, Nowy Wiśnicz (PL);
Krzysztof Rudek, Nowy Wiśnicz (PL);
Vinod A. Valecha, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/837,167

(22) Filed: Dec. 11, 2017

(65) Prior Publication Data
US 2018/0107584 A1 Apr. 19, 2018

Related U.S. Application Data (63) Continuation of application No. 15/190,425, filed on Jun. 23, 2016.

(51) Int. Cl.
*G06F 11/36* (2006.01)
(52) U.S. Cl.
CPC ...... *G06F 11/3636* (2013.01); *G06F 11/3688* (2013.01)
(58) Field of Classification Search
CPC .................................................. G06F 11/3636
(Continued)

(56) References Cited

U.S. PATENT DOCUMENTS 6,907,545 B2 6/2005 Ramadei et al.
7,200,525 B1 4/2007 Williams et al.
(Continued)

FOREIGN PATENT DOCUMENTS

WO 2014043623 A1 3/2014

OTHER PUBLICATIONS

Reidemeister et al., "Diagnosis of Recurrent Faults using Log Files", Published in: CASCON '09, Proceedings of the 2009 Conference of the Center for Advanced Studies on Collaborative Research, pp. 12-23.
(Continued)

*Primary Examiner* — Emerson C Puente
*Assistant Examiner* — Sen Thong Chen
(74) *Attorney, Agent, or Firm* — Richard A. Wilhelm (57) ABSTRACT

A method finding the root cause of errors and/or unexpected behavior of a monitored software application, the method comprising: providing a decision tree corresponding to an error and/or unexpected behavior of a software application, wherein the decision tree comprising multiple nodes, wherein the decision tree further comprising one or more leaf nodes, wherein the leaf nodes indicates at least one reason and one or more possible solutions for the error and/or unexpected behavior; scanning one or more log-files of a software application; determining, based on the decision tree and the scanned log files which step has been not performed by the software application, wherein the non-performed step being indicative for an error and/or unexpected behavior of the software application; determining a leaf node based on the determined non-performed step; extracting information from the leaf node; and providing a reason and/or a solution of the error and/or unexpected behavior.

8 Claims, 5 Drawing Sheets

(58) Field of Classification Search
USPC .......................................................... 717/132
See application file for complete search history.

(56) References Cited

U.S. PATENT DOCUMENTS

| | | |
|---|---|---|
| 7,225,368 B2 | 5/2007 | Lancaster |
| 7,689,872 B2 | 3/2010 | Doyle et al. |
| 7,856,575 B2 | 12/2010 | Bock et al. |
| 7,895,323 B2 | 2/2011 | Gupta et al. |
| 8,407,673 B2 | 3/2013 | Terpolilli |
| 8,539,285 B2 | 9/2013 | Daily et al. |
| 9,710,752 B2 | 7/2017 | Salajegheh et al. |
| 2004/0187048 A1 | 9/2004 | Angamuthu et al. |
| 2008/0294670 A1 | 11/2008 | Borissov et al. |
| 2014/0024348 A1* | 1/2014 | Hurst .................. H04M 3/5232 455/414.1 |
| 2015/0317361 A1* | 11/2015 | Battaglia ........... G06F 17/30306 707/718 |
| 2016/0335260 A1* | 11/2016 | Convertino ......... G06F 17/3053 |
| 2017/0270032 A1* | 9/2017 | Ballal ................. G06F 11/3672 |
| 2017/0308456 A1* | 10/2017 | Barsness ............. G06F 11/3612 |
| 2018/0101426 A1 | 4/2018 | Cunico et al. |

OTHER PUBLICATIONS

Xu et al., "Detecting Large-Scale System Problems by Mining Console Logs", SOSP '09, Oct. 11-14, 2009, pp. 117-131.

Iyer et al., U.S. Appl. No. 15/190,425, filed Jun. 23, 2016, entitled "Sysem and Method for Detecting and Alerting Unexpected Behavior of Software Applications", pp. 1-33.

IBM: List of IBM Patents or Patent Applications Treated as Related (Appendix P), Dec. 28, 2017, pp. 1-2.

* cited by examiner

FIG. 5b

SYSTEM AND METHOD FOR DETECTING AND ALERTING UNEXPECTED BEHAVIOR OF SOFTWARE APPLICATIONS

BACKGROUND

The present invention relates to methods for detecting errors/exceptions and unexpected behavior of software applications. More specifically, the present document relates to a method for detecting errors/exceptions and unexpected behavior of software applications based on decision trees.

BRIEF SUMMARY

Additional aspects and/or advantages will be set forth in part in the description which follows and, in part, will be apparent from the description, or may be learned by practice of the invention.

A computer-implemented method finding the root cause of errors and/or unexpected behavior of a monitored software application, the method comprising: providing a decision tree corresponding to an error and/or unexpected behavior of a software application, wherein the decision tree comprising multiple nodes and the nodes are coupled by branches, wherein the decision tree further comprising one or more leaf nodes, wherein the leaf nodes indicates at least one reason and one or more possible solutions for the error and/or unexpected behavior; scanning one or more log-files of a software application and running through the decision tree based on the steps included in the scanned log files; determining, based on the decision tree and the scanned log files which step has been not performed by the software application, wherein the non-performed step being indicative for an error and/or unexpected behavior of the software application; determining a leaf node based on the determined non-performed step; extracting information from the leaf node; and providing a reason and/or a solution of the error and/or unexpected behavior associated with the non-performed step based on the extracted information.

A computer-implemented method finding the root cause of unexpected behavior of a software application in a usage scenario, the method comprising the steps of: providing a decision tree corresponding to a usage scenario of a software application, wherein the decision tree comprising multiple nodes and the nodes are coupled by branches, wherein the decision tree further comprising one or more leaf nodes, wherein the leaf nodes indicating at least one reason and one or more possible solutions for the unexpected behavior; providing a list of steps which have to be executed in order to achieve a certain behavior of the software application in the usage scenario; scanning one or more log-files of a software application; checking, based on the list of steps to be executed, the one or more scanned log-file to determine if the one or more log-files contain information regarding the execution of all steps in the list; running through the decision tree based on the steps included in the scanned log file, when a step in the list of steps has not been executed; determining a leaf node of the decision tree that corresponds to the non-executed step; extracting information from the determined leaf node of the decision tree; and providing a reason for not executing the step and/or a solution to avoid unexpected behavior in the usage scenario based on the extracted information.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 2b illustrates a decision tree corresponding to the usage scenario of the log file of FIG. 2a;

FIG. 4b illustrates a decision tree corresponding to the usage scenario of the log file of FIG. 4a;

FIG. 5a illustrates an example log file according to a third usage scenario;

FIG. 5b illustrates a decision tree corresponding to the usage scenario of the log file of FIG. 5a.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Reference will now be made in detail to the embodiments of the present invention, examples of which are illustrated in the accompanying drawings, wherein like reference numerals refer to like elements throughout.

According to an example embodiment, the scanning of log-files is performed in parallel to the execution of the monitored software application. Thereby, a prompt detection of possible errors or indications to future unexpected behavior is possible. Alternatively, the monitoring method can be started also before the regular execution of the software application in order to determine whether a certain error has been logged during the installation phase and remedy the error before executing the software application.

According to example embodiments, the log file comprises multiple log entries, wherein a certain log entry of the log file is associated with a certain node of the decision tree.

Thereby, the decision tree can be traversed by subsequently following nodes which correspond to the steps included in the scanned log file.

According to example embodiments, a plurality of decision trees is provided and a certain decision tree out of the plurality of decision trees is selected based on the actual usage scenario or an encountered error. It may also be possible that multiple usage scenarios are covered by a single decision tree. The decision tree may map steps to be performed during the usage scenario or which may be performed in association with the occurrence of a certain failure.

According to example embodiments, the running through the decision tree is triggered by a message included in a log file, the message indicating an error or unexpected behavior of the monitored software application. So, in other words, if an error occurs, a certain decision tree may be selected by considering the occurred error and the decision tree is traversed based on the steps included in the log file until a step is found which caused the error.

According to example embodiments, a list of possible error scenarios including one or more key words indicating an error is provided wherein based on the list the occurrence of a certain error can be detected when scanning the log files. For example, the list may include specific key words which indicate a certain failure or exception. Thereby, a definition is provided which kind of information included in the log file is indicative for a failure.

According to example embodiments, the provided solution is executed automatically in order to remedy an occurred error and/or unexpected behavior. Thereby, a prompt solution for the occurred error is obtained.

According to example embodiments, feedback is provided to a user, the feedback informing the user regarding an encountered error or possibly occurring unexpected behavior. Thereby, the administrator is directly informed regarding the occurrence of one or more errors.

According to example embodiments, the method is triggered by noticing a statement corresponding to a certain usage scenario. For example, a certain user input or system state may indicate a certain usage scenario. After recognizing the usage scenario, certain log files can be scanned in order to determine whether all steps for achieving expected behavior of the monitored software application are executed/performed.

According to example embodiments, a plurality of lists of steps is provided and a certain list out of the plurality of lists is selected based on the respective usage scenario. So, depending on the respective usage scenario, a certain set of steps may be deemed to be essential for an expected functionality of the software application and the steps for the respective usage scenario are obtained by selecting the list based on the recognized usage scenario.

According to example embodiments, feedback is provided to a user, the feedback informing the user regarding not executing at least one step. Thereby, the administrator is directly informed that a certain step has been not executed and that, due to the non-execution of the step, unexpected software application behavior may occur.

The term "software application" as used in the present disclosure may relate to a single software application as well as a software application being included in a software environment comprising a plurality of software modules. The "software application" may be a part of a system, for example, a production system which is controlled by means of the software application.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In a broad sense, the present invention generally relates to methods for detecting reasons why a software application failed to provide expected functionality and to proactively alert a user when an error condition, exception or unexpected behavior of the software application is foreseen. The proposed method may work in parallel with the software application being monitored. The method is adapted to detect reasons by parsing log files, find error messages from the log files, traverse through a provided decision tree and find the reason for the error and advise the end user on the error, the reason for the error and a possible solution for the error. In an alternative embodiment, the method may be adapted to foresee exceptions just before an error or exception has been thrown, but the final result is not in line with the expected one. The anticipatory recognizing of exceptions may be performed based on messages and/or information included in the log files.

Figure 1:
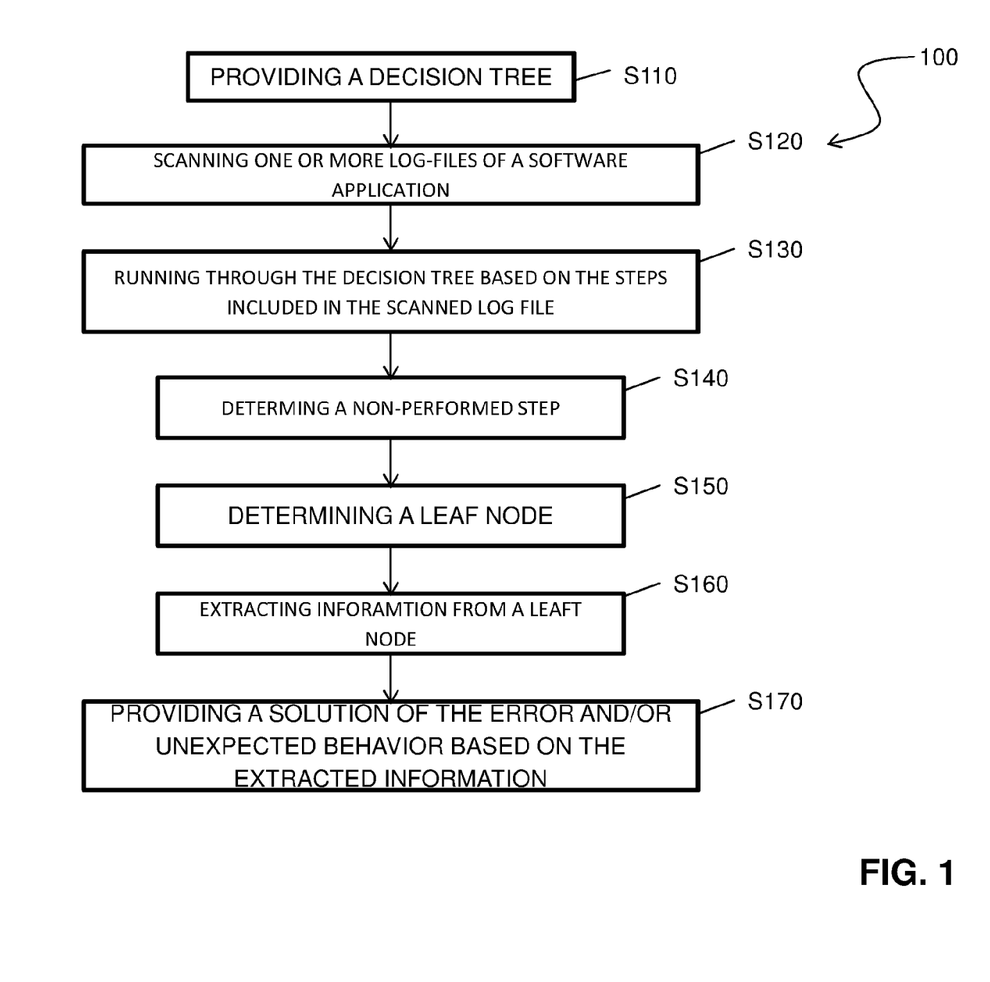
FIG. 1 illustrates a schematic flow chart of a method for detecting errors/exceptions and unexpected behavior of software applications according to a first embodiment.

FIG. 1 illustrates an example work flow 100 of a method for finding the root cause of an error and/or unexpected behavior of a software application being monitored when performing the method. The terms "error" or "exception" according to the present invention refers to any malfunction of a software application, for example, a malfunction leading to a termination of the program or limited functionality of the program etc. The term "unexpected behavior" according to the present invention refers to non-desired functionality of the program, e.g. by providing wrong results, limited functionality, limited access to certain program features etc.

Figure 2A:
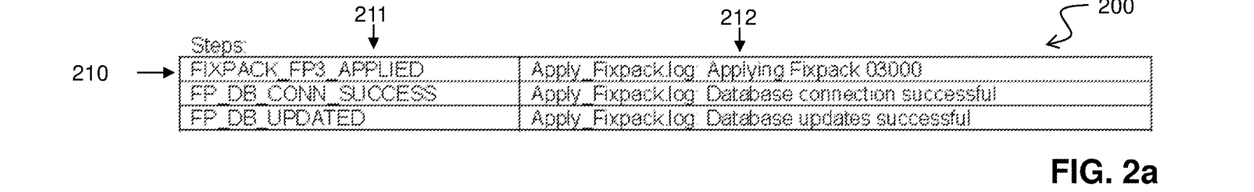
FIG. 2a illustrates an example log file according to a first usage scenario.
Figure 2B:
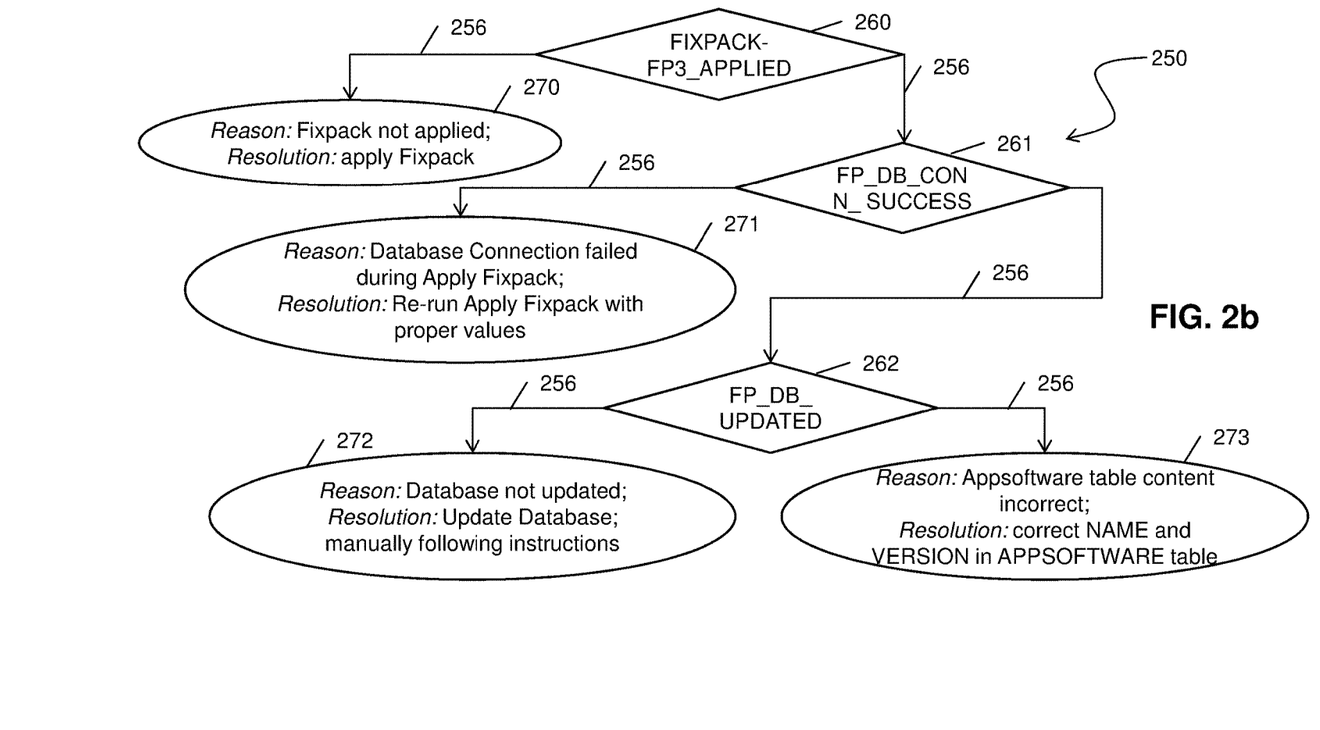
Figure 4A:
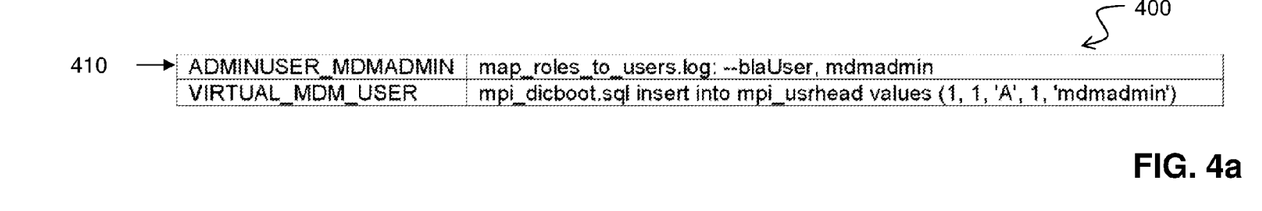
FIG. 4a illustrates an example log file according to a second usage scenario.
Figure 4B:
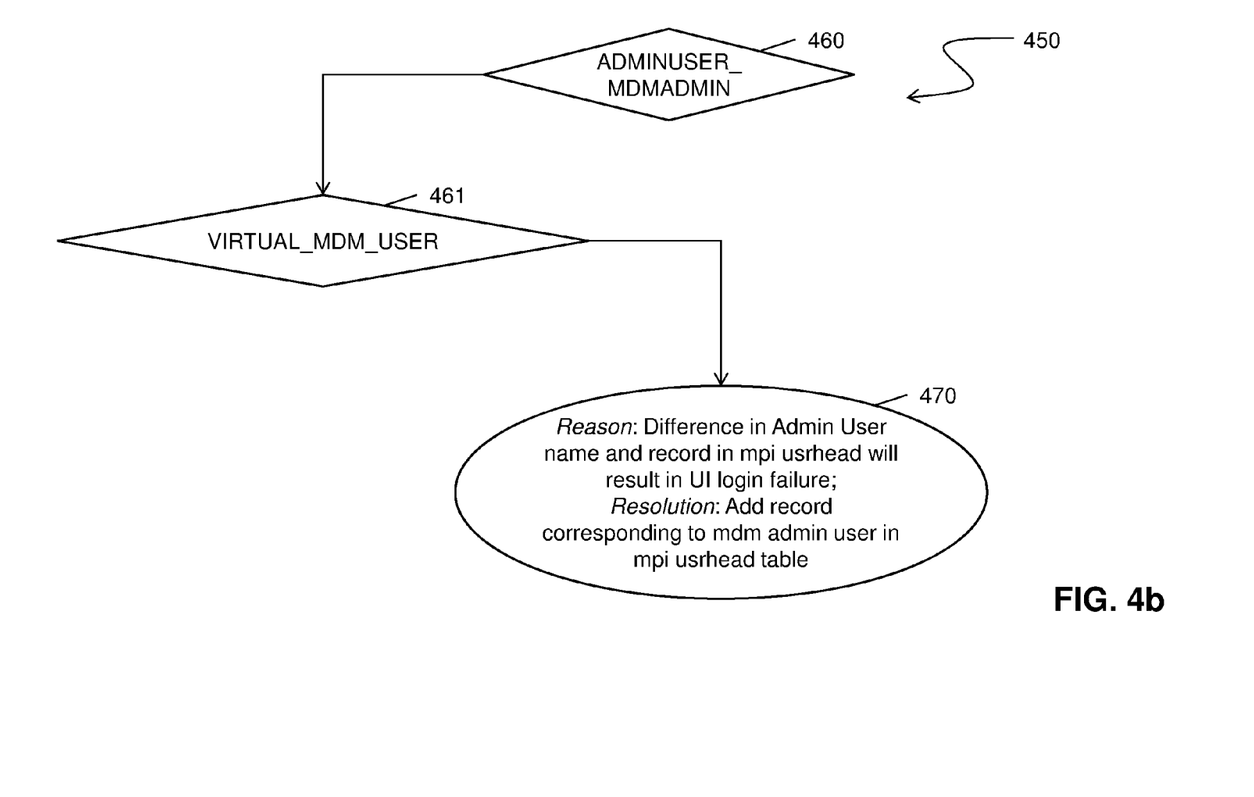
Figures 5A, 5B:
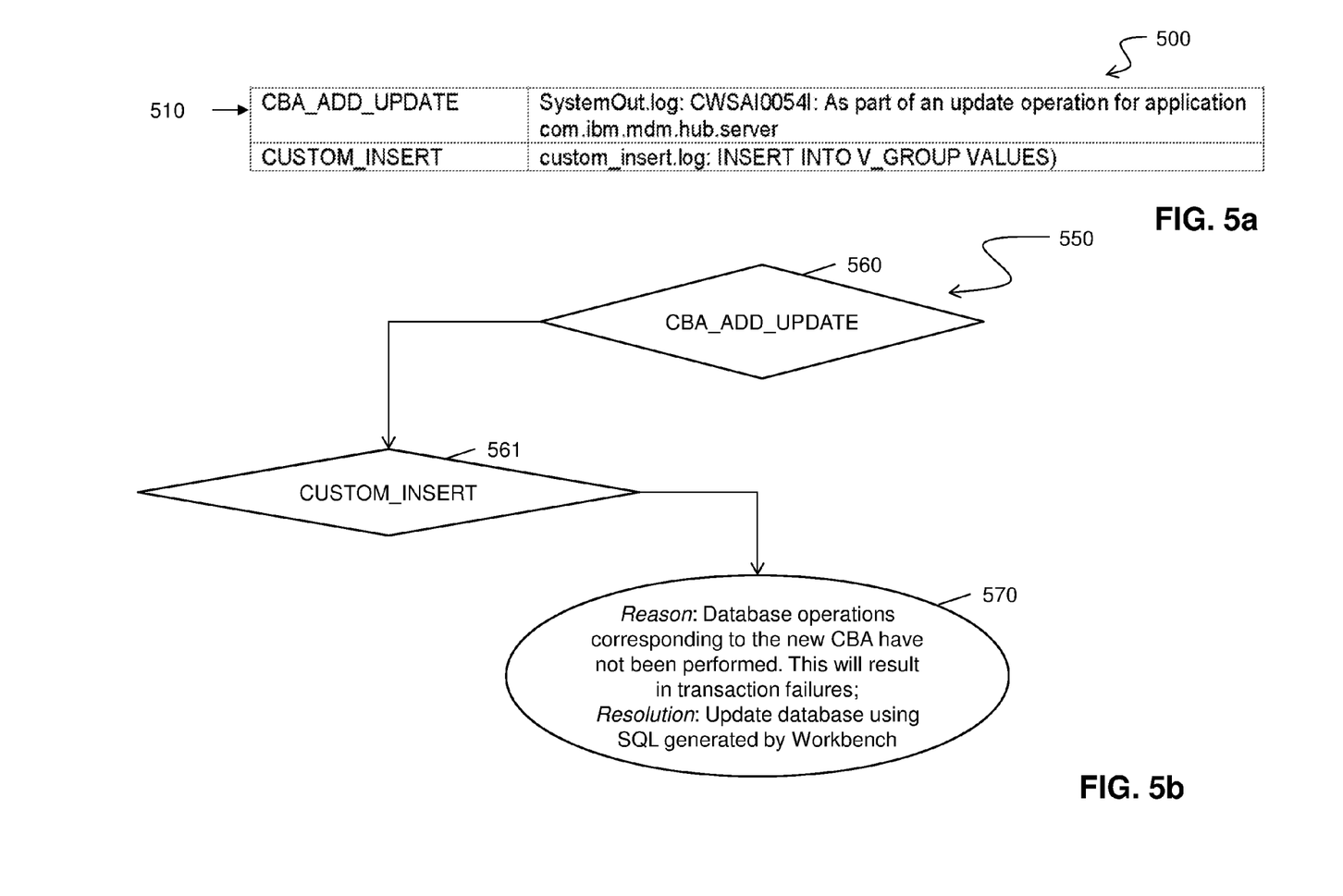

As a basis of the method 100, a decision tree is provided (S110). Examples of the decision trees are illustrated in FIGS. 2b, 4b and 5b, which are further described in detail below. Each decision tree comprises multiple nodes (represented by the diamonds in FIGS. 2b, 4b and 5b) and branches coupling the nodes. In addition, the decision tree comprises one or more leaf nodes (represented by ellipses in FIGS. 2b, 4b and 5b). A decision tree is associated with one or more usage scenarios, respectively, one or more exceptions that may occur within the monitored software application. The decision tree may map the basic structure of a usage scenario and/or the steps which are performed before a certain exception/error occurs.

More in detail, a certain decision tree may be generated before performing the monitoring of the software application. The decision tree may be created for a specific usage scenario or error/exception by considering existing log files which have been created during prior executions of the software application. The log files show the specific behavior of the software application in the specific usage scenario, respectively, in case of an error/exception. In other words, the decision tree may be at least partially created automatically. Alternatively or in addition, the decision tree may at least be partially created by a human administrator. The log files may include a plurality of steps being performed by the monitored software application in the respective usage scenario or error/exception. The steps performed according to a certain usage scenario or error/exception are shown in FIGS. 2a, 4a and 5a described below. Each step comprises a key/value pair, wherein the key may represent the name of the step and the value is a description that will appear in one of the log files generated by the software application being monitored.

Each node (diamond in FIGS. 2b, 4b and 5b) in the decision tree refers to a certain step in the log file. The branches of the decision tree which connect a pair of adjacent nodes indicate that after a certain step (associated with a certain node) a further step (indicated by a further subsequent node) should be performed. In other words, the decision tree provides based on the queue of nodes a road map for an expected behavior of a certain error scenario or usage scenario.

Based on the decision tree, a monitoring and detection of unexpected behavior or error scenario of the software application is possible. More in detail, one or more log files of the monitored software application are scanned (S120). The scanning can be done during the execution of the software application, i.e. simultaneously with the logging of status information of the software application. The currently updated logging files are scanned in order to evaluate the current state of the monitored software application. However, the scanning can also be performed after completing a certain log file. Furthermore, the log files may be log files created during installation (installation logs) of the software application. The monitoring system may search the installation logs for error messages loaded to it in order to uncover installation errors before the installed software application is executed for the first time.

The monitoring system may comprise information regarding possible error scenarios, for example, a list of possible error scenarios. In addition, the information may also include specific key words which indicate errors/exceptions. The information regarding possible error scenarios may be used to detect the occurrence of an error/exception. Each error/exception may be associated with a certain decision tree. Thus, the decision tree used in further processing may be selected based on the detected error/exception. In other words, the monitoring system may comprise a plurality of decision trees covering different error/exception cases. A certain decision tree suitable for finding the root cause of the present error can be selected by determining the error scenario based on an error indicator included in a log file and select a suitable decision tree for the respective error/exception.

After selecting the suitable decision tree, the decision tree is traversed (S130). The traversing or running through the decision tree is performed based on the steps included in the log files in which an error indicator has been found. As described before, each log file includes a sequence of steps. Each step of the log file is associated with a certain node of the respective decision tree. Therefore, based on the log file steps, the monitoring system can run through the decision tree. Due to the exception/error, the log file may not comprise all steps which are included in the decision tree. So, by traversing the decision tree based on the steps included in the log file, a step can be determined which has not been executed due to the occurrence of the error (S140). It is worth mentioning that the steps and plurality of decision trees will be specific to the software application being monitored.

The decision tree may comprise information regarding the root cause of the error/exception. The information may be provided in association with the step found to be not performed. More in detail, the last node which has been performed at last may comprise a branch to a node being associated with the step which has not been executed and a further branch to a leaf node. The leaf node may comprise information indicating the reason why the error/exception occurred and may comprise also information how to remedy the error/exception. So, based on the non-performed step it is possible to determine a leaf node (S150), extract information regarding the reason of the error/exception and its solution out of the leaf node (S160) thereby being able to provide a reason and/or a solution to the respective error/exception (S170). Alternatively or in addition, the administrator or another user may be informed regarding the occurrence of an error and/or unexpected behavior. Based on the information regarding the reason and/or solution an administrator of the monitored software application may be able to remedy the root cause of the error/exception. Alternatively, an automated remedy of the root cause of the error/exception may be initiated. In addition, the information regarding the reason of the error/exception and its solution may also comprise a pointer to the documentation of the software application in order enable the administrator to receive further information regarding the error/exception.

FIGS. 2a and 2b refer to a first implementation example of the upper-described method. The method may be triggered by an error message or exception message found in a log file, for example, in the log files of a server. For example, the found error message may be "000000b6 XMLPayload-Tra E Error in getting config element of JSON response array objects." The log file, respectively, the error message may be associated with a certain error scenario. The error scenario may be linked with a certain decision tree. The decision tree may be used in the following for finding the root cause of the error. More in detail, for finding the root cause, the method may traverse through the decision tree based on the steps included in the log file comprising the error message. Alternatively, the error message may not be directly included in the log file but the error message is associated with a certain log file and the associated log file is used for traversing through the decision tree.

FIG. 2a shows the steps 210 included in the log file 200. Each step 210 comprises a step name 211 and a description 212 associated with the step name. The description 212 may be generated by the monitored software application. The present example refers to a database environment. The log file 200 indicates that three steps has been performed, namely a first step of applying a fixpack, a second step of testing the database connection and a third step indicating that the database has been updated. Based on the steps included in the log file 200, the decision tree 250 illustrated in FIG. 2b is traversed. The decision tree 250 comprises multiple decision diamonds 260, 261, 262 coupled with branches 256. The log file 200 indicates that three steps 210 referring to the decision diamonds 260, 261, 262 has been performed. As such, by traversing the decision tree 250, the decision diamond 262 is reached.

Each decision diamond 260, 261, 262 is coupled with a leaf node 270, 271, 272, 273 by means of branches 256. The leaf nodes 270, 271, 272, 273 may comprise a hint or a pointer to the reason why a certain step associated with the preceding certain decision diamond 260, 261, 262 could not be executed. In addition, the leaf nodes 270, 271, 272, 273 may also comprise a hint or a pointer to a solution how the root cause of the error can be solved. So, by traversing the decision tree 250 based on the steps 210 included in the log file 200, a leaf node 270, 271, 272, 273 can be found which includes or points to information regarding the reason and the solution of the error/exception. In the present embodiment, the leaf node 273 is reached (by additionally considering the description 212 of the last executed step 210) which provides respective reason/solution information.

Figure 3:
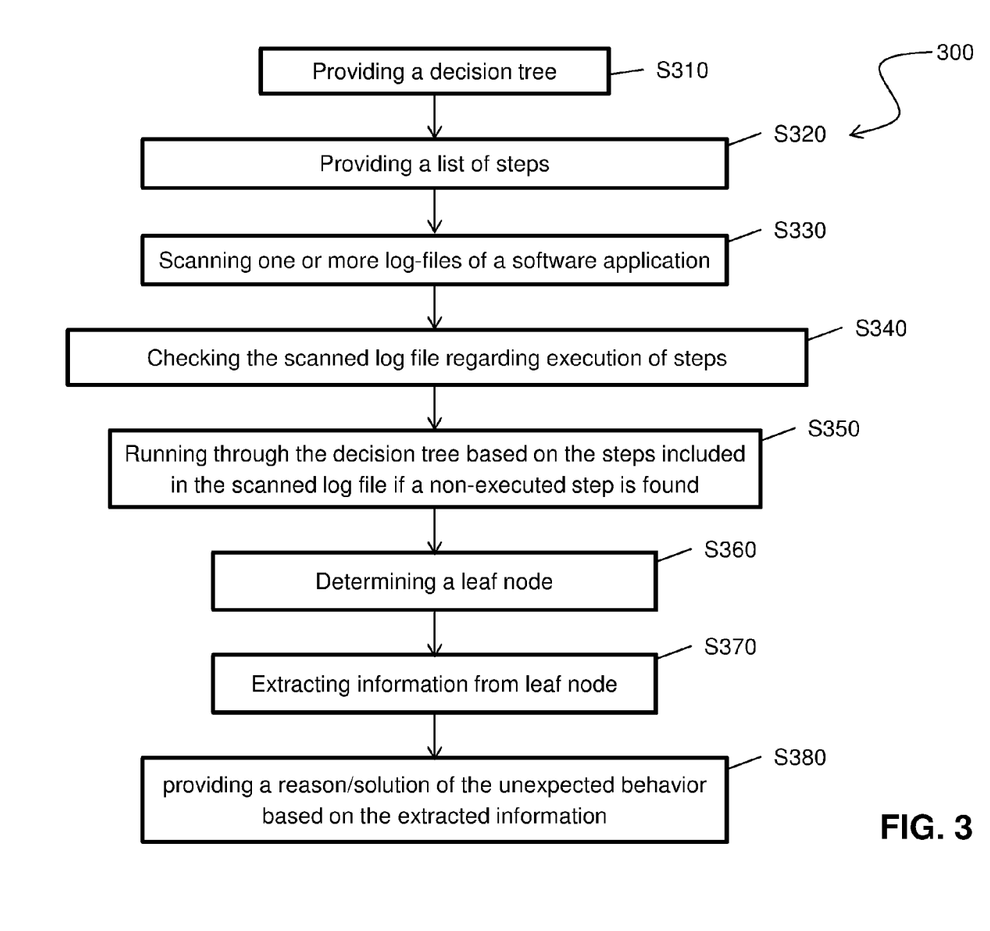
FIG. 3 illustrates a schematic flow chart of a method for detecting errors/exceptions and unexpected behavior of software applications according to a second embodiment.

FIG. 3 illustrates an example work flow 300 of a method for finding the root cause of an unexpected behavior preventively, i.e. well before an error or exception occurred. Similar to the embodiment of FIG. 1, as a basis of the method 300, a decision tree is provided (S310). The basic structure of the decision tree is similar to the upper-mentioned embodiments. Therefore, reference is made to the description of the decision tree above. Similarly, the decision tree may be generated in advance. Regarding the generation of the decision tree, also reference is made to the description above.

Based on such decision tree, finding the root cause of unexpected behavior of the software application before an occurrence of an error/exception is possible. In other words, a prevention of error/exception scenarios is possible. In order to recognize unexpected behavior, a list of steps to be performed in a certain usage scenario is provided (S320). The list comprises those steps which have to be included in a certain log file associated with a certain usage scenario in order to achieve an expected behavior of the software application. In other words, the list comprises all steps which are necessary for a certain functionality of the software application.

The one or more log files of the monitored software application are scanned (S330). The scanning can be done during the execution of the software application, i.e. simultaneously with the logging of status information of the software application. The currently updated logging files are scanned in order to evaluate the current state of the monitored software application. However, the scanning can also be performed after completing a certain log file. Furthermore, the log files may be log files created during installation (installation logs) of the software application.

Based on the list of steps, the scanned log file is checked whether all steps have been executed (S340). If so, the monitored software is evaluated to run as expected and no further action is necessary. If not (a non-executed step has been found), the monitored software application may show an unexpected behavior. In order to find preventively the root cause of the unexpected behavior and solve the reason for the unexpected behavior, the monitoring method may initiate a run through the decision tree (S350). The monitoring system may comprise a set of multiple decision trees wherein each decision tree is associated with a certain usage scenario. One decision tree may be selected based on the current usage scenario (also used for selecting the list of steps). The run through the decision tree may be performed based on the steps included in the scanned log file.

As described before, each log file includes a sequence of steps. Each step of the log file is associated with a certain node of the respective decision tree. Therefore, based on the log file steps, the monitoring system can run through the decision tree. Due to the missing step, the log file may not comprise all steps which are included as associated nodes in the decision tree. So, by traversing the decision tree and based on the determined non-executed step, a step can be determined which has not been executed.

The decision tree may comprise information regarding the root cause of the unexpected behavior. The information may be provided in association with the step which has been not executed. More in detail, the node being associated with the step which has not been executed comprises a branch to a leaf node. The leaf node may comprise information indicating the reason why the step has not been executed and may comprise also information how to remedy the issue. So, based on the non-executed step it is possible to determine a leaf node (S360) and extract information regarding the reason why the step has been not executed and its solution out of the leaf node (S370). Thereby it is possible to provide a reason and/or a solution why the step has not been executed and thereby a hint to a future unexpected behavior (S380). Specifically, the administrator, respectively, another user may be informed that a certain step has not been executed and that the software application may show unexpected behavior. Based on the information regarding the reason and/or solution an administrator of the monitored software application may be able to remedy the root cause thereby preventively avoiding a future unexpected behavior. Alternatively, an automated remedy of the root cause of the non-executed step may be initiated. In addition, the information regarding the reason for the non-executed step and its solution may also comprise a pointer to the documentation of the software application in order enable the administrator to receive further information.

FIGS. 4a and 4b refer to an implementation example of a method according to the workflow of FIG. 3. FIG. 4a shows a log file 400 with multiple steps 410 and FIG. 4b shows a decision tree 450 corresponding to the log file 400. The decision tree 450 and the log file 400 refer to a certain usage scenario. The usage scenario in the present example is the detection of certain inconsistencies in the configuration of an application. More in detail, during the configuration of a software application, certain errors may occur which may not lead to an immediate error or exception but to an unexpected behavior later on. As such, it is advantageous to provide a mechanism to detect such configuration inconsistencies in order to inform the administrator or user about the inconsistencies and thereby avoiding the unexpected behavior.

The present example refers to IBM InfoSphere Platform. During InfoSphere Master Data Management (MDM) configuration, an MDM administrator user is created in the WebSphere user repository. The user name commonly used is 'mdmadmin'. A record with user name 'mdmadmin' is inserted into table mpi_usrhead. Only those users for which a corresponding record existing in mpi_usrhead table will be allowed to login to certain User Interfaces. So, in other words, if there is a mismatch between the admin user name and the record in the table mpi_usrhead, a login failure may appear.

The method using the decision tree according to FIG. 4b may inform the end user to insert a row into mpi_usrhead table, when the MDM administrator user is not mdmadmin, thereby preventing a failure when the user tries to login to a User Interface. In the present embodiment, the monitoring method is started when detecting a certain statement (e.g. creating an MDM administrator user) which corresponds to a certain usage scenario (e.g. user administration). The usage scenario may be linked with a list of steps, the list reflecting which steps have to be included in one or more log files in order to obtain a desired behavior of the monitored software application.

Referring to the log file 400, an step of the present usage scenario is the insertion of the record comprising the user name 'mdmadmin' into the table mpi_usrhead (second step in the log file). Decision tree 450 includes, for example, decision diamond 460, decision diamond 461, and leaf node 470. Referring to the decision tree 450, if the step is missing, the leaf node 470 associated with the decision diamond 461 may contain or provide a hint towards the reason of future unexpected behavior and a solution for avoiding the unexpected behavior. Thereby, unexpected behavior and/or exceptions can be avoided preventively.

FIGS. 5a and 5b refer to a further implementation example of a method according to the workflow of FIG. 3, namely for a usage scenario in the field of software configuration by adding certain software components. More in detail, when a new Component Bundle Archive (CBA) is added, the monitoring method may check whether the corresponding inserts have been made to the database. When logs corresponding to inserts are missing, the customer is informed, thereby preventing malfunction during transaction execution.

FIG. 5a shows a log file 500 indicating the steps 510 performed in the present usage scenario. Similarly, as described before, a list of steps may be provided which defines which steps has to be executed in order to achieve an expected behavior of the monitored software application. More in detail, the list of steps may define which steps indicating inserts into the database have to be performed in order to avoid future problems.

Based on the log file 500, the decision tree 550 of FIG. 5b is traversed thereby determining the reason why a step is missing and finding a solution for the missing step. Referring to the log file 500, a step of the present usage scenario is the update of the data base by inserting issues corresponding to the added software component (second step in the log file). Decision tree 550 includes, for example, decision diamond 560, decision diamond 561, and leaf node 570. Referring to the decision tree 550, if the step is missing, the leaf node 570 associated with the decision diamond 561 may contain or provide a hint towards the reason of future unexpected behavior and a solution for avoiding the unexpected behavior. Thereby, unexpected behavior and/or exceptions can be avoided preventively.

The plurality of decision trees used for handling errors/exceptions and used for preventively avoid unexpected behavior of software applications have to be adapted in case of software changes, for example. In case that a new decision tree is provided for a certain exception which is already associated with an existing decision tree, the system will try to merge the decision trees. One possible condition whether two decision trees can be merged is whether one of the decision trees encompasses the steps of the other. So, in other words, for merging two decision trees it is checked if one of the decision trees is fully included in the other one. If so, a merging of decision trees is performed. If not, an appropriate reason will be provided to the end user.

In order to enable the monitoring system to read the log files, the system will receive information regarding the path in which the log files can be found. Furthermore, read access may be provided to the log files generated by the monitored software application. For example, the monitoring system is informed that the installer logs are available at a first directory (e.g. INSTALLDIR/logs folder) and runtime logs are available at further directories (e.g. RUNTIMEDIR/logs and WAS_PROFILE_DIR/logs). Read access may be provided for the monitoring system to all sub folders and files in these directories, so that all files included in the directories can be searched.

According to certain embodiments, the monitoring method will run in parallel with the monitored software application and keep parsing the log files which may be generated continuously or in certain intervals. As soon as the monitoring method is started it will start searching the files in the install logs for error messages loaded to it. It will maintain a list of error messages found in the install logs. In case that error messages and exceptions are found, for each exception the system will traverse the decision tree corresponding to the found exception, find out which steps have been performed and which have not been performed from the logs and reach a leaf node based on the failed or missing step. It will then inform the user of the exception, the reason for the exception and a possible solution for the exception based on the details found in the leaf node. Thereby, installation errors are uncovered before the monitored system is used for production.

Summing up, a monitoring method has been presented which uses a decision tree. The method is advantageous because downtime in production environments is reduced and a prediction of possible malfunction is possible, based on which crashes can be avoided. In addition, alerts to the software development team are provided based on which they can find out new issues, if any, get an insight of errors and their impact and hints how to fix the errors together with one or more links to required documentation.

Based on the foregoing, a computer system, method, and computer program product have been disclosed. However, numerous modifications and substitutions can be made without deviating from the scope of the present invention. Therefore, the present invention has been disclosed by way of example and not limitation.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A computer-implemented method for finding a root cause of an error or unexpected behavior of a monitored software application, the method comprising:
   providing a decision tree corresponding to an error or unexpected behavior of a software application, wherein the decision tree includes one or more nodes, the nodes being coupled by branches, the decision tree further including one or more leaf nodes, the leaf nodes containing at least one reason and one or more possible solutions for the error or unexpected behavior;
   scanning one or more log files of a software application and running through the decision tree based on steps included in the scanned log files;
   determining, based on the decision tree and the scanned log files, a step that has been not performed, wherein the non-performed step is indicative of an error or unexpected behavior of the software application;
   determining a leaf node based on the determined non-performed step;
   extracting information from the leaf node; and
   providing a reason or a solution of the error or unexpected behavior associated with the non-performed step based on the extracted information.

2. The computer-implemented method of claim 1, wherein the scanning of log-files is performed in parallel with an execution of the software application.

3. The computer-implemented method of claim 1, wherein the log file comprises multiple log entries, and wherein a certain log entry of the log file is associated with a certain node of the decision tree.

4. The computer-implemented method of claim 1, wherein a plurality of decision trees are provided and a decision tree out of the plurality of decision trees is selected based on an unexpected behavior or error.

5. The computer-implemented method of claim 1, wherein the running through the decision tree is triggered by a message included in a log file, the message indicating an error or unexpected behavior of the monitored software application.

6. The computer-implemented method of claim 1,
wherein a list of possible error scenarios includes one or more key words associated with each of the possible error scenarios; and
wherein the scanning one or more log files of a software application includes searching for one or more key words within the one or more log files to detect an error.

7. The computer-implemented method of claim 1, wherein the provided solution is executed automatically in order to remedy an occurred error or unexpected behavior.

8. The computer-implemented method of claim 1, further comprising:
providing feedback to a user, the feedback informing the user regarding an encountered error or possibly occurring unexpected behavior.

* * * * *